(12) United States Patent
Hayashi

(10) Patent No.: US 7,308,344 B2
(45) Date of Patent: Dec. 11, 2007

(54) TIRE ROTATION ASSISTING APPARATUS

(75) Inventor: Hiromasa Hayashi, Oobu (JP)

(73) Assignee: DENSO CORPORATION, Kariya (JP)

( * ) Notice: Subject to any disclaimer, the term of this patent is extended or adjusted under 35 U.S.C. 154(b) by 406 days.

(21) Appl. No.: 11/119,702

(22) Filed: May 3, 2005

(65) Prior Publication Data
US 2005/0256619 A1    Nov. 17, 2005

(30) Foreign Application Priority Data
May 12, 2004    (JP)    ............................ 2004-142285

(51) Int. Cl.
*G06F 19/00*    (2006.01)
(52) U.S. Cl. .................. 701/30; 701/29; 340/447; 340/457.4; 73/146
(58) Field of Classification Search ............... 701/1, 701/29, 30, 32; 340/438, 442, 444, 445, 340/447, 457, 457.4; 73/146, 146.2, 146.5, 73/146.8
See application file for complete search history.

(56) References Cited

U.S. PATENT DOCUMENTS

| | | | | |
|---|---|---|---|---|
| 5,838,229 A | * | 11/1998 | Robinson, III | .............. 340/442 |
| 6,259,361 B1 | * | 7/2001 | Robillard et al. | ............ 340/447 |
| 6,278,363 B1 | * | 8/2001 | Bezek et al. | ................ 340/442 |
| 6,731,205 B2 | * | 5/2004 | Schofield et al. | ............ 340/444 |
| 7,197,922 B2 | * | 4/2007 | Rimkus et al. | ................ 73/146 |
| 2003/0107481 A1 | | 6/2003 | Sawafuji | |
| 2006/0238323 A1 | * | 10/2006 | Watabe et al. | ............... 340/442 |
| 2006/0250228 A1 | * | 11/2006 | Mori et al. | .................. 340/447 |

* cited by examiner

*Primary Examiner*—Gary Chin
(74) *Attorney, Agent, or Firm*—Posz Law Group, PLC

(57) ABSTRACT

Tire-side transmitters, attached to respective tires, have inherent ID numbers. On-vehicle receivers, disposed on an automotive vehicle, receive signals containing ID numbers. A control unit, disposed on the automotive vehicle, can identify tire mounting positions of respective tires based on the signals containing ID numbers received by the on-vehicle receivers. The controlling means memorizes information related to tire mounting positions of respective tires. Furthermore, the controlling means causes a displaying means disposed on the automotive vehicle to inform an automobile user of information relating to tire rotation, such as appropriate shifting directions instructing desirable tire mounting positions for respective tires, when predetermined tire rotation timing has come.

5 Claims, 3 Drawing Sheets

TIRE ROTATION ASSISTING APPARATUS

CROSS-REFERENCE TO RELATED APPLICATION

This application is based upon and claims the benefit of priority from earlier Japanese Patent Application No. 2004-142285 filed on May 12, 2004, so that the description of which is incorporated herein by reference.

BACKGROUND OF THE INVENTION

The present invention relates to a tire rotation assisting apparatus capable of assisting tire rotation performed by each automobile user.

To ensure the tires of an automotive vehicle to wear evenly and last longer, it is preferable and effective to perform tire rotation periodically to change the positions of respective tires, for example, from front to back and left to right on the diagonal. Appropriately performing the tire rotation in this manner brings the merits of equalizing wear conditions of respective tires and preventing deflected or partial abrasions. As a result, the lifetime of each tire can be elongated.

However, it is usual that executing the tire rotation is dependent on the will of each user. Furthermore, the optimum tire rotation method or order should be differentiated depending on the driving type (e.g. difference between FF drive and FR drive) of an automotive vehicle. Therefore, it is necessary for automobile users to know optimum rotation methods or orders suitable for their automotive vehicles. When a user performs tire rotation, there is the possibility that this user does not know or check the mileage (i.e. cumulative traveling distance) from the previous tire rotation timing. Furthermore, it is usual that automobile users periodically replace summer-season tires with winter-season tires or vice versa. In these cases, the users may not remember previous mounting positions of respective tires in the situation that these tires are again mounted to the automotive vehicle after they are once removed from this automotive vehicle. From the above reasons, there is the possibility that the tire rotation is not appropriately performed.

SUMMARY OF THE INVENTION

In view of the above-described problems, the present invention has an object to provide a tire rotation assisting apparatus capable of appropriately assisting tire rotation performed by an automobile user.

In order to accomplish the above and other related object, the present invention provides a tire rotation assisting apparatus for assisting tire rotation performed by an automobile user who rotates a plurality of tires respectively mounted at predetermined tire mounting positions of an automotive vehicle from present positions to different positions selected from the predetermined tire mounting positions. The tire rotation assisting apparatus of this invention includes identification information transmitting means disposed on the tires for transmitting signals containing identification information inherent to respective tires. Furthermore, the tire rotation assisting apparatus includes identification information receiving means disposed on the automotive vehicle for receiving signals containing the identification information. A displaying means is disposed on the automotive vehicle for visually informing the automobile user of information relating to the tire rotation. A controlling means, disposed on the automotive vehicle, controls display of the displaying means.

The controlling means identifies the tire mounting positions of respective tires based on signals containing the identification information transmitted from the identification information transmitting means to the identification information receiving means. The controlling means memorizes information related to the tire mounting positions of the tires. The controlling means causes the displaying means to inform the automobile user of information relating to tire rotation when predetermined tire rotation timing has come. In this case, the information relating to tire rotation contains information instructing desirable tire mounting positions of respective tires.

According to the tire rotation assisting apparatus of this invention, the automobile user can surely know an arrival of tire rotation timing and can appropriately perform tire rotation with reference to the shifting directions instructing desirable tire mounting positions. As a result, the automobile user can accomplish the tire rotation appropriately.

Furthermore, it is preferable that the controlling means memorizes a standard mileage for tire rotation representing a cumulative traveling distance of the automotive vehicle at the time the tires are mounted to the tire mounting positions. And, the controlling means judges that the predetermined tire rotation timing has come when a difference between a present vehicle mileage and the standard mileage for tire rotation reaches a predetermined distance.

Furthermore, there is the possibility that automobile users replace summer-season tires with winter-season tires or vice versa. In such a case, it is preferable that the identification information transmitting means is also disposed on exchange tires to be replaced with the tires mounted at the tire mounting positions. The controlling means memorizes previous tire mounting positions of the exchange tires. And, the controlling means judges that the predetermined tire rotation timing has come when the tires are replaced with the exchange tires.

In this case, it is further preferable that the tire rotation assisting apparatus further includes inputting means for allowing the automobile user to operate. The controlling means makes a judgment based on an operation signal entered from the inputting means as to whether or not the tires are replaced with the exchange tires.

Furthermore, it is preferable that the tire rotation assisting apparatus further includes state-of-tire detecting means disposed on respective tires to detect conditions of respective tires. The identification information transmitting means transmits a signal containing not only the identification information but also the conditions of respective tires to the identification information receiving means. According to this arrangement, it is unnecessary to additionally provide the devices transmitting the identification information of respective tires (1 to 4) required for the tire rotation assisting control.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

First Embodiment

Hereinafter, a tire rotation assisting apparatus in accordance with a first embodiment of the present invention will be explained with reference to FIGS. 1 to 3.

Figure 1:
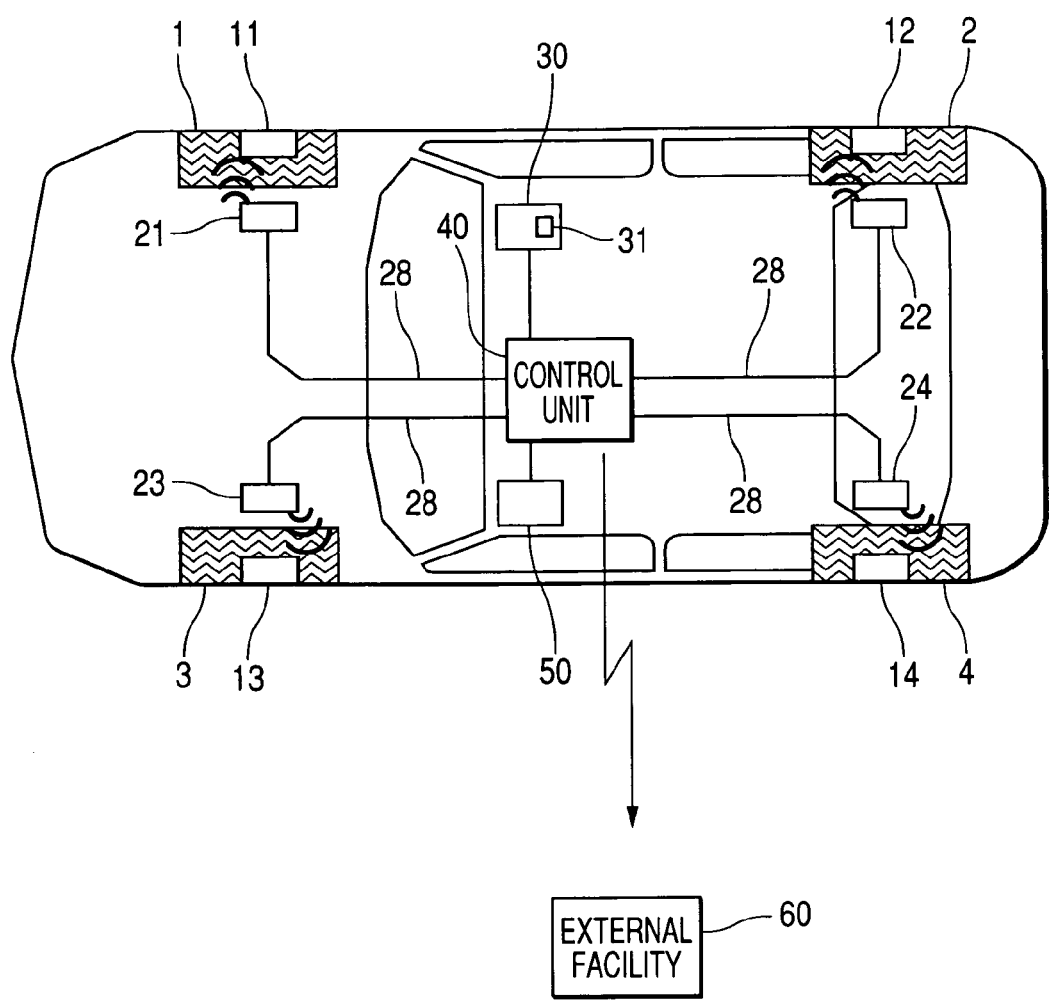
FIG. 1 is a plan view showing a schematic arrangement of a tire rotation assisting apparatus in accordance with a first embodiment of the present invention.

FIG. 1 is a plan view showing a schematic arrangement of a tire rotation assisting apparatus in accordance with the first embodiment of the present invention.

As shown in FIG. 1, the tire rotation assisting apparatus of this embodiment includes tire-side transmitters 11 to 14 (i.e. transmitters attached to respective tires), on-vehicle receivers 21 to 24 (i.e. receivers installed on a vehicle body), a display apparatus 30, and a control unit 40. According to this embodiment, respective tire-side transmitters 11 to 14 correspond to the identification information transmitting means of the present invention. Respective on-vehicle receivers 21 to 24 correspond to the identification information receiving means of the present invention. The display apparatus 30 corresponds to the displaying means of the present invention. The control unit 40 corresponds to the controlling means of the present invention.

The tire-side transmitters 11 to 14 are attached to respective tires 1 to 4. For example, the tire-side transmitters 11 to 14 are integrally formed with air valves of general disk wheels. Each of the transmitters 11 to 14 has a built-in battery serving as a power source. Respective tire-side transmitters 11 to 14 have the capability of transmitting data relating to tire pneumatic pressures of respective tires 1 to 4 to the on-vehicle receivers 21 to 24. Although not shown in the drawing, sensing portions (e.g. state-of-tire detecting means) are provided to detect pneumatic pressures (i.e. state-of-tires) of respective tires 1 to 4.

Regarding the sensing portions, it is desirable to use other sensors capable of detecting temperatures in respective tires in addition to (or instead of) tire pneumatic pressures. The tire-side transmitters 11 to 14 of this embodiment are arranged so as to posse the capability of transmitting radio waves carrying state-of-tire information relating to tire pneumatic pressures measured by the sensing portions thereof. The on-vehicle receivers 21 to 24 receive the radio waves transmitted from their corresponding or associated tire-side transmitters 11 to 14.

Furthermore, inherent identification numbers (i.e. identification information) are assigned to respective tire-side transmitters 11 to 14. More specifically, the identification numbers are used to identify respective tire-side transmitters 11 to 14 and are accordingly differentiated from each other. These identification numbers are contained in the above-described state-of-tire information transmitted from the tire-side transmitters 11 to 14 to the corresponding on-vehicle receivers 21 to 24.

The sensing portions correspond to the state-of-tire detecting means of the present invention. The tire-side transmitters 11 to 14 correspond to the identification information transmitting means of the present invention. The on-vehicle receivers 21 to 24 correspond to the identification information receiving means of the present invention.

The on-vehicle receivers 21 to 24 have receiving antennas capable of receiving the radio waves transmitted from respective tire-side transmitters 11 to 14. The on-vehicle receivers 21 to 24 are attached to predetermined portions of a vehicle body in a confronting relationship with the corresponding or associated tires 1 to 4, respectively. More specifically, the on-vehicle receivers 21 to 24 are located in respective wheel houses of the vehicle body.

The on-vehicle receivers 21 to 24 are respectively connected via signal lines 28 to the control unit (ECU: electronic control unit) 40. When respective on-vehicle receivers 21 to 24 receive radio waves transmitted from their corresponding or associated transmitters 11 to 14, the on-vehicle receivers 21 to 24 transmit voltage signals based on received radio waves to the control unit 40. Although FIG. 1 shows a wire arrangement for transmitting the voltage signals from respective on-vehicle receivers 21 to 24 to the control unit 40, it is possible to replace this wire arrangement with a comparable wireless arrangement.

An automotive vehicle is equipped with a display apparatus 30 which can display various information and data. The display apparatus 30 informs the automobile user of tire rotation to be periodically performed as well as information relating to tire pneumatic pressures. For example, a navigation apparatus can be used for the display apparatus 30 of this embodiment. Furthermore, the navigation apparatus serving as the display apparatus 30 is equipped with a switch 31. This switch 31 can be operated by the automobile user as inputting means. For example, the automobile user can operate the switch 31 to switch the contents displayed on the display apparatus 30. An operation signal entered by the switch 31 is sent to the control unit 40.

The control unit 40 has an arrangement including a microcomputer and memories such as ROM and RAM. The control unit 40 receives, via on-vehicle receivers 21 to 24, the state-of-tire information including tire identification numbers transmitted from the tire-side transmitters 11 to 14. The identification numbers of respective tire-side transmitters 11 to 14 are registered beforehand in the control unit 40. Thus, the control unit 40 can identify respective tire-side transmitters 11 to 14 based on the identification numbers contained in the signals transmitted from respective tire-side transmitters 11 to 14.

Furthermore, the control unit 40 outputs an operational instruction signal to the display apparatus 30. The display apparatus 30 performs a predetermined display based on the operational instruction signal. Furthermore, the control unit 40 receives information relating to vehicle mileage from a meter control unit (meter ECU) 50 which performs display control of vehicle mileage. Furthermore, the control unit 40 outputs an operational instruction signal to a voice generating section (not shown) to cause the voice generating section to output predetermined voice messages. The control unit 40 receives electric power from a vehicle battery (not shown). The control unit 40 supplies electric power to respective on-vehicle receivers 21 to 24.

The control unit 40 memorizes information relating to tire rotation in its memory. The control unit 40 performs a tire rotation assisting control based on the information relating to tire rotation.

The information relating to tire rotation includes mounting positions of respective tires 1 to 4 in an automotive vehicle. The mounting positions of respective tires 1 to 4 are correlated with the identification numbers identifying respective tires 1 to 4. The control unit 40 can identify one out of the on-vehicle receivers 21 to 24 as a receiver having received the radio wave including the identification number which has been transmitted from one of the tire-side transmitters 11 to 14. Thus, the control unit 40 can identify the tire equipped with the transmitter presently sending the radio wave including the identification number. In other words, the control unit 40 can identify the mounting position of this tire in an automotive vehicle.

Furthermore, the information relating to tire rotation includes a standard mileage for tire rotation which is used in judging an appropriate timing of the tire rotation. More specially, the standard mileage for tire rotation (hereinafter, referred to as "tire rotation standard mileage") is a vehicle mileage measured at the time the tires 1 to 4 have been mounted to predetermined positions of an automotive vehicle. In this respect, the tire rotation standard mileage is a vehicle mileage at the time the tires 1 to 4 have been replaced with brand-new ones or a vehicle mileage at the time the tire rotation for the tires 1 to 4 has been performed. The control unit 40 memorizes a tire rotation standard mileage common to all tires 1 to 4.

Furthermore, the optimum tire rotation method or order is generally differentiated according to the driving type of an automotive vehicle. For example, in the case of an FF vehicle (i.e. front-wheel-drive vehicle), it is desirable that tire rotation includes moving a front-right tire to a rear-right position, a front-left tire to a rear-left position, a rear-right tire to a front-left position, and a rear-left tire to a front-right position, respectively. Furthermore, in the case of an FR vehicle (i.e. rear-wheel-drive vehicle), it is desirable that tire rotation includes moving a rear-right tire to a front-right position, a rear-left tire to a front-left position, a front-right tire to a rear-left position, a front-left tire to a rear-right position, respectively. Thus, the control unit 40 memorizes the appropriate methods (i.e. the above-described tire rotation orders) preferable for all driving types of the automotive vehicles.

Furthermore, the control unit 40 can transmit an electronic mail to an external facility 60 in response to establishment of predetermined conditions. For example, the predetermined conditions include an arrival of a vehicle mileage suitable for performing the tire rotation. The external facility 60 is preferably a tire retailer or a tire repair shop, or any other facilities of vehicle and/or tire manufacturers. The external facility 60 is not limited to only one facility and accordingly it is possible to provide a plurality of external facilities.

Next, the tire rotation assisting control performed by the tire rotation assisting apparatus of this embodiment will be explained.

First of all, the control unit 40 judges whether or not the predetermined tire rotation timing has come. More specifically, at a predetermined timing, the control unit 40 obtains a difference between a present vehicle mileage and the tire rotation standard mileage. Then, the control unit 40 checks whether or not the obtained difference exceeds a predetermined distance being set beforehand as a criterion for the tire rotation, thereby judging whether or not the predetermined tire rotation timing has come. The predetermined timing for performing the above tire rotation necessity judgment is, for example, the timing of turning on an ignition switch (namely, when the engine is started). Furthermore, the predetermined distance being set as a criterion for the tire rotation can be set arbitrarily. According to this embodiment, the predetermined distance is 5,000 km to 10,000 km.

When the control unit 40 judges that the difference between the present vehicle mileage and the tire rotation standard mileage exceeds the above predetermined distance, the control unit 40 outputs an operational instruction signal to the display apparatus 30 and causes the display apparatus 30 to display the information relating to tire rotation.

Figure 2:
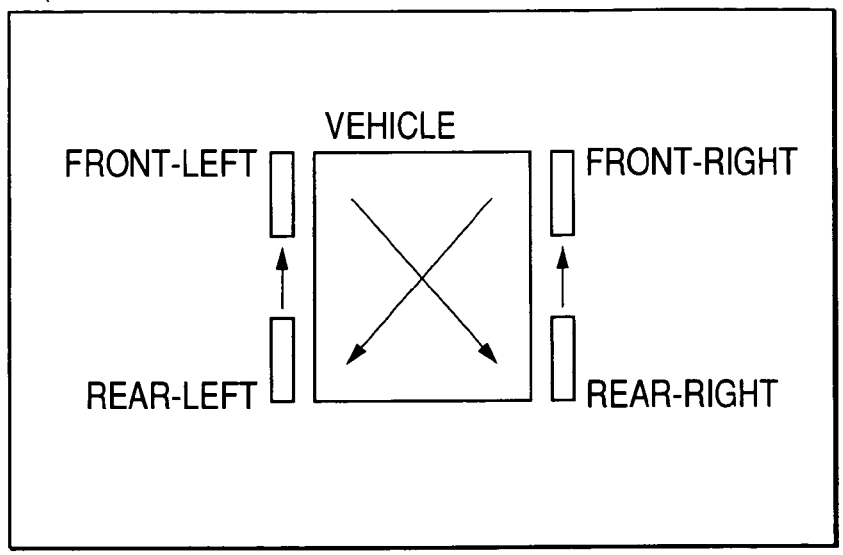
FIG. 2 is a view explaining a practical example of a display apparatus which displays information relating to tire rotation.

FIG. 2 shows a practical example of the information relating to tire rotation displayed on the display apparatus 30. As shown in FIG. 2, the display apparatus 30 displays optimum shifting directions (instructing desirable tire mounting positions) for respective tires 1 to 4. In other words, the display apparatus 30 can instruct an optimum tire rotation order or method to the automobile user. The example shown in FIG. 2 indicates shifting the rear-right tire to the front-right position, shifting the rear-left tire to the front-left position, shifting the front-right tire to the rear-left position, and shifting the front-left tire to the rear-right position.

When respective tires 1 to 4 are removed from the present mounting positions and shifted toward different positions, the control unit 40 can receive the signals produced from respective tire-side transmitters 11 to 14 via the on-vehicle receivers 21 to 24. Accordingly, the control unit 40 can judge whether or not the tires 1 to 4 are moving along the optimum shifting directions (instructing desirable tire mounting positions) instructed by the display apparatus 30. Therefore, in the process of rotating the tires 1 to 4 along the optimum shifting directions (instructing desirable tire mounting positions), it is possible to inform the automobile user of the result of tire rotation (e.g. OK or NG) on the display apparatus 30 or by using the voice generating section.

Figure 3:
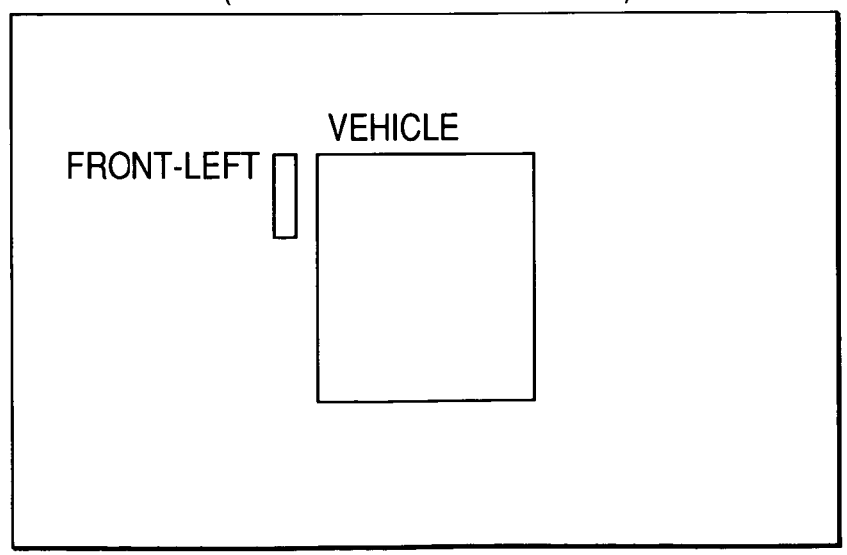
FIG. 3 is a view explaining a practical display of the display apparatus in a case that a tire is mounted to a front-left tire position of an automotive vehicle.

FIG. 3 is a display example of the display apparatus 30 showing the tire being mounted to the front-left tire position of an automotive vehicle. For example, the control unit 40 can cause the display apparatus 30 to display the screen shown in FIG. 3 in the process of mounting the tire to the front-left position of the automotive vehicle. Furthermore, when the tire to be mounted to the front-left tire position of the automotive vehicle approaches to the front-left tire position, the control unit 40 causes the voice generating section to output a voice message, such as "Mounting of the front-left tire is correctly accomplished." On the other hand, when the tire to be mounted to the front-left tire position of the automotive vehicle approaches to a different position, the control unit 40 causes the voice generating section to output a voice message, such as "Mounting is failed. Try again mounting to the front-left position."

Furthermore, when the control unit 40 judges that the difference between the present vehicle mileage and the tire rotation standard mileage exceeds the above predetermined distance, the control unit 40 transmits an electronic mail notifying an arrival of tire rotation timing to the external facility 60. In response to such an electronic mail, the external facility 60 can send an advertising (electronic or normal) mail to the automobile user. For example, the advertising mail sent to the automobile user includes recommendation of tire rotation together with tire goods information, such as new types and their prices.

As apparent from the foregoing explanation, the tire rotation assisting apparatus of this embodiment can appropriately inform the automobile user of the arrival of tire rotation timing. In other words, the tire rotation assisting apparatus of this embodiment can encourage the user to perform the tire rotation. Furthermore, using the display apparatus 30 to notify the user of appropriate tire positions brings the effect of assisting the user to accurately accomplishing the tire rotation. Furthermore, this embodiment can use the state-of-tire detecting sensors as the tire-side transmitters 11 to 14 transmitting the identification information to identify respective tires 1 to 4, because these sensors inherently have the capability of transmitting sensing values to the vehicle controller. In other words, it is unnecessary to additionally provide the devices for transmitting the identification numbers of respective tires 1 to 4 required for the tire rotation assisting control.

Second Embodiment

Next, a tire rotation assisting apparatus in accordance with a second embodiment of the present invention will be explained with reference to FIG. 4.

The second embodiment is explained based on a situation that summer-season tires of an automotive vehicle are replaced with winter-season tires or vice versa. The control unit 40 stores information relating to tire rotation not only for the presently used tires 1 to 4 but also for other tires to be seasonally replaced, so that the tire rotation assisting control can be performed at all seasons.

According to the control unit 40 of the second embodiment, its memory memorizes information relating to tire rotation for seasonal tires which are not presently used for an automotive vehicle but will be replaced in the next reason, in addition to the information relating to tire rotation for the presently used tires 1 to 4 of this automotive vehicle. The information relating to tire rotation generally includes present mounting positions (and/or previous mounting positions) of respective tires in relation to the automotive vehicle body as well as the tire rotation standard mileage.

Like the presently mounted tires 1 to 4 of the automotive vehicle, the seasonal tires to be replaced in the next season (i.e. seasonal exchange tires) are equipped with transmitters. The transmitters attached to the seasonal exchange tires have identification numbers respectively different from the identification numbers assigned to the transmitters 11 to 14 attached to the presently mounted tires 1 to 4. The memory of control unit 40 memorizes information relating to tire rotation for these seasonal exchange tires in relation to their identification numbers, in the same manner as for the tires 1 to 4 presently used for the automotive vehicle.

The control unit 40 performs the tire rotation assisting control based on the information relating to tire rotation for the presently used tires 1 to 4. In the case that an automobile user replaces the presently used tires 1 to 4 with seasonal exchange tires, the control unit 40 needs to switch the information used for the tire rotation assisting control; namely, from the information relating to the presently used tires 1 to 4 to the information corresponding to the identification numbers of seasonal exchange tires. According to this embodiment, an automobile user can operate the switch 31 (i.e. inputting means) to cause the control unit 40 to switch the information relating to tire rotation to be used in the tire rotation assisting control.

According to this second embodiment, the predetermined tire rotation timing is a time the automobile user replaces the tires (e.g. summer-season tires) presently used for an automotive vehicle with the seasonal exchange tires (e.g. winter-season tires). Accordingly, the control unit 40 detects an arrival of the predetermined tire rotation timing when the automobile user operates the switch 31. In response to the input of automobile user, the control unit 40 starts the tire rotation assisting control in the same manner as in the above-described first embodiment.

Figure 4A:
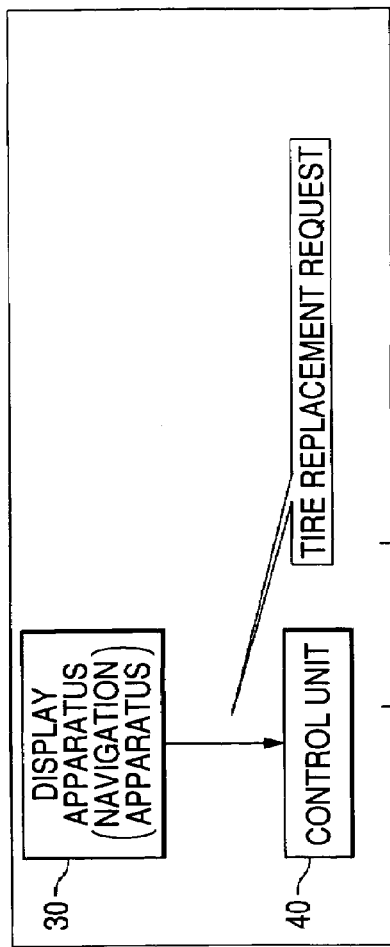
FIGS. 4A, 4B, and 4C are views explaining communications performed between the display apparatus and a control unit in accordance with a second embodiment of the present invention.

FIG. 4 is a view explaining communications performed between the display apparatus (i.e. navigation apparatus) 30 and the control unit 40 in the case that the presently used summer-season tires are replaced with the winter-season tires. First, an automobile user operates the switch 31 provided on the display apparatus 30. In this case, as shown in FIG. 4A, the display apparatus 30 transmits a replacement request signal instructing replacement from the summer-season tires to the winter-season tires. The control unit 40 receives the replacement request signal sent from the display apparatus 30.

Figure 4B:
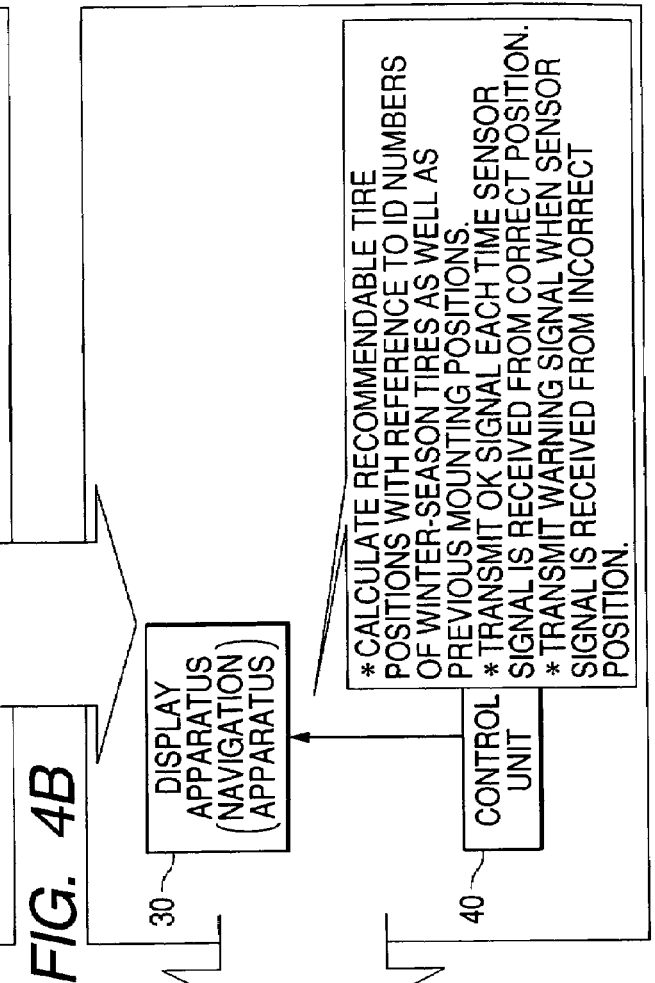

Next, as shown in FIG. 4B, the control unit 40 calculates recommendable tire positions with reference to identification numbers (IDs) of the winter-season tires as well as previous mounting positions of these winter-season tires. Then, the control unit 40 causes the display apparatus 30 to display the obtained recommendable tire positions. Then, the control unit 40 transmits an answer signal indicating OK to the display apparatus 30 each time the control unit 40 receives a sensor signal from a correct position (i.e. the recommendable tire position). On the other hand, the control unit 40 transmits a warning signal to the display apparatus 30 in an event that the control unit 40 receives a sensor signal from an incorrect position (i.e. any position other than the recommendable tire position), so that the automobile user can move the tire to a correct position (e.g. to the front-right position) according to the indication given from the display apparatus 30.

Figure 4C:
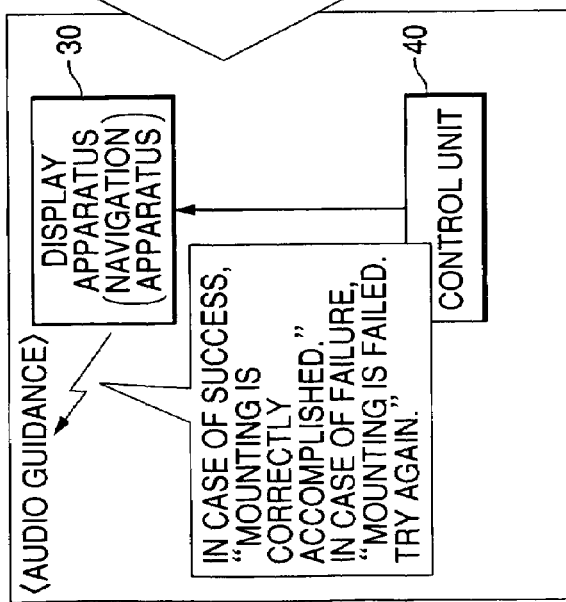

The display apparatus 30 performs the display of OK notification or NG notification for the automobile user based on the signal sent from the control unit 40. Furthermore, as shown in FIG. 4C, it is possible to cause the voice generating section to perform an audio guidance such as "Mounting is correctly accomplished" when the tire is correctly mounted to the recommendable tire position, or an audio guidance such as "Mounting is failed. Try again" when the tire is not correctly mounted to the recommendable tire position.

As described above, even in the case that summer-season tires are replaced with winter-season tires seasonally for an automotive vehicle, it is unnecessary for the automobile user to memorize or remember the previous mounting positions of respective seasonal exchange tires. Thus, the automobile user can appropriately perform the tire rotation with aid of the tire rotation assisting apparatus of this embodiment, in the mounting work of the seasonal exchange tires to the automotive vehicle.

Other Embodiment

According to the above-described embodiments, the control unit 40 memorizes the tire rotation standard mileage common to all tires 1 to 4. However, it is possible to arrange the control unit 40 so as to memorize the tire rotation standard mileage for each one of respective tires 1 to 4.

Furthermore, according to the above-described embodiments, the information relating to tire rotation is informed to the automobile user. However, the control unit 40 can judge an arrival of the tire replacing timing based on a cumulative mileage of each one of respective tires 1 to 4, and inform an automobile user of the necessity of tire replacement when the tire replacing timing has come.

What is claimed is:

1. A tire rotation assisting apparatus for assisting tire rotation performed by an automobile user who rotates a plurality of tires respectively mounted at predetermined tire mounting positions of an automotive vehicle from present positions to different positions selected from said predetermined tire mounting positions, comprising:

identification information transmitting means disposed on said tires, for transmitting signals containing identification information inherent to respective tires;

identification information receiving means disposed on said automotive vehicle for receiving signals containing said identification information;

a displaying means disposed on said automotive vehicle for visually informing the automobile user of information; and controlling means disposed on said automotive vehicle for controlling display of said displaying means, wherein said controlling means identifies said tire mounting positions of respective tires based on signals containing said identification information transmitted from said identification information transmitting means to said identification information receiving means, said controlling means memorizes information related to said tire mounting positions of said tires, and said controlling means causes said displaying means to inform the automobile user of information relating to tire rotation when predetermined tire rotation timing has come, said information relating to tire rotation containing information instructing desirable tire mounting positions of respective tires.

2. The tire rotation assisting apparatus in accordance with claim 1, wherein said controlling means memorizes a standard mileage for tire rotation representing a cumulative traveling distance of the automotive vehicle at the time said tires are mounted to said tire mounting positions, and said controlling means judges that said predetermined tire rotation timing has come when a difference between a present vehicle mileage and said standard mileage for tire rotation reaches a predetermined distance.

3. The tire rotation assisting apparatus in accordance with claim 1, wherein said identification information transmitting means is also disposed on exchange tires to be replaced with said tires mounted at said tire mounting positions, said controlling means memorizes previous tire mounting positions of said exchange tires, and said controlling means judges that said predetermined tire rotation timing has come when said tires are replaced with said exchange tires.

4. The tire rotation assisting apparatus in accordance with claim 3, further comprising:

inputting means for allowing said automobile user to operate, wherein said controlling means makes a judgment based on an operation signal entered from said inputting means as to whether or not said tires are replaced with said exchange tires.

5. The tire rotation assisting apparatus in accordance with claim 1, further comprising:

state-of-tire detecting means disposed on respective tires to detect conditions of respective tires, wherein said identification information transmitting means transmits a signal containing not only said identification information but also said conditions of respective tires to said identification information receiving means.

* * * * *